Oct. 11, 1927.
D. T. MAY
1,645,152
WIRE SPLICING MACHINE
Filed May 29, 1926
2 Sheets-Sheet 1
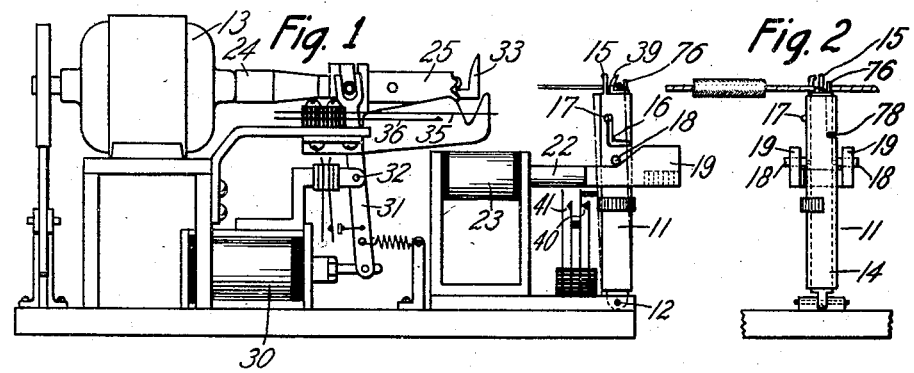
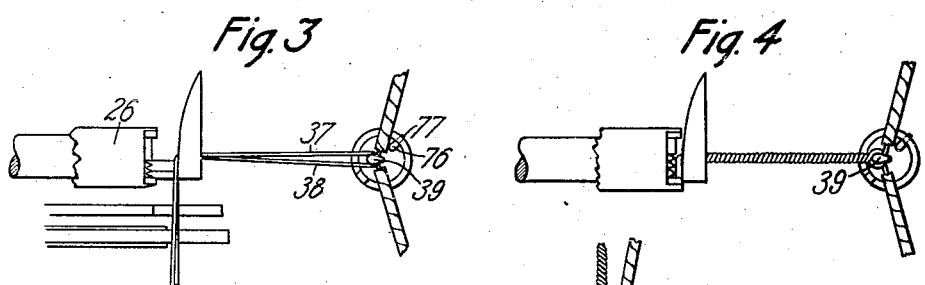
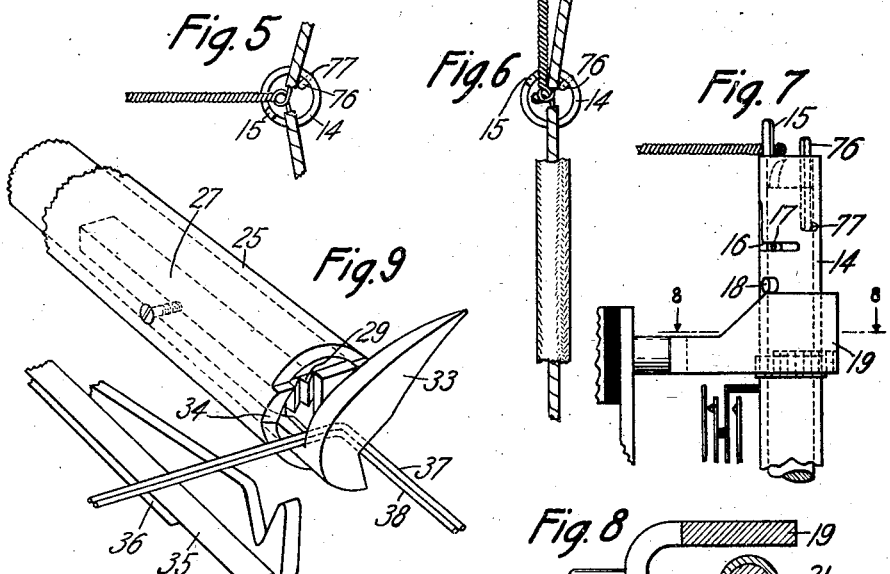
Inventor:
David T. May
by _[signature]_ Atty.

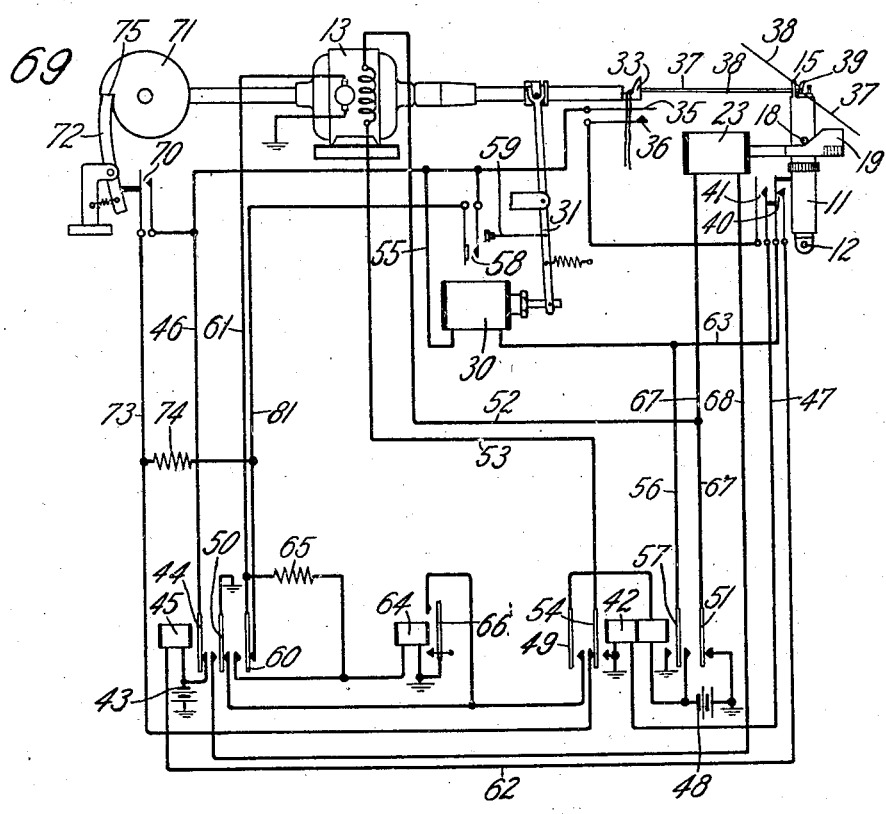

Patented Oct. 11, 1927.

1,645,152

UNITED STATES PATENT OFFICE.

DAVID T. MAY, OF PORT WASHINGTON, NEW YORK, ASSIGNOR TO BELL TELEPHONE LABORATORIES, INCORPORATED, OF NEW YORK, N. Y., A CORPORATION OF NEW YORK.

WIRE-SPLICING MACHINE.

Application filed May 29, 1926. Serial No. 112,496.

This invention relates to a machine for splicing wires.

In both telephone and telegraph line work it often becomes necessary to connect the wires of one cable to the wires of a second cable. These cables may contain a large number of individual wires and, if the splicing has to be done manually, the time and the labor expended is very large.

The object of this invention is to provide a machine which will produce uniform solderless splices in a short time and with only a slight amount of manual labor.

A machine, somewhat similar to the one of this invention, is disclosed in the co-pending application of D. T. May and C. G. McCormick, Serial No. 28,320, filed May 6, 1925, and consists of a twisting mechanism which first grips the two wires to be spliced, cuts off the surplus lengths and then twists the wires together. By doing this work mechanically rather than manually, it is possible to rapidly produce splices which are substantially uniform in length and of a quality comparable to soldered splices.

In the machine of the above application, the splice is made about a small lug, which also acts as an aid in stripping the insulation from the wires. After the splice is made, it is necessary to remove it from the lug and fold the spliced portion into substantial alignment with the wires of which the splice is a part. The removing and folding of the splice is a manual operation and the present invention is an improvement of the above machine specifically directed to the removing and folding of the splice.

In accordance with the present invention there is provided an automatically operating solenoid, the plunger of which actuates a sleeve which surrounds the head for holding the wires, to remove the splice from the lug and bend it into alignment with the wires at the completion of the splice. In addition to giving the twisted portions a more uniform alignment than when this operation is done manually, a considerable amount of time is saved.

This and other features will appear from the following description in connection with the attached drawings showing a preferred form of the invention, and in which Fig. 1 is a side elevation of the machine as a whole; Fig. 2 is a front view of the head for holding the wires to be spliced; Fig. 3 shows the relation of the wires and the device for twisting them before the twisting operation; Fig. 4 is the same as Fig. 3 after the twisting operation; Fig. 5 shows the twisted wires previous to folding the spliced portions; Fig. 6 shows the spliced portions folded into alignment with the wires; Fig. 7 shows in more detail the head for holding the wires and the means for removing them from the head; Fig. 8 shows further details of the splice removing mechanism; Fig. 9 shows in detail the mechanism for gripping the wires, cutting off the surplus lengths and twisting the wires together; and, Fig. 10, is a schematic diagram of the wiring of the machine.

The machine consists essentially of a motor having a projecting horn mounted on one end of its shaft. A slidable sleeve on the shaft cooperates with the projecting horn to cut off the surplus lengths of the wires and hold them against the horn. A solenoid operates the sleeve. A wire holding head, mounted on the same base as the motor and placed at a short distance from the end of the shaft on which the horn is fixed, has a lug around which the wires to be spliced are drawn previous to being gripped by the sleeve on the motor shaft. When the motor operates, the horn twists the wires together with the lug on the wire holding head as the starting point of the twist. At the completion of the twist, a second solenoid is brought into operation automatically and actuates a sleeve rotatable about and slidable along the wire holding head. This sleeve is arranged to remove the twist from the lug and fold it into alignment with the wires. The motor shaft also extends out from the motor on the side away from the twisting mechanism. On this extension is mounted a cam arranged to actuate a contact which controls a circuit to position the motor for the next splicing operation.

Referring particularly to Fig. 1, the wire holding head, which is shown in the normal position is pivoted at 12 so that it may move toward and away from the motor 13. A sleeve 14, as shown in more detail in Fig. 7, has at its upper end a lug 15 which forces the twisted portion of the wire into alignment with the other wires when the sleeve is operated. A member 76, which is slidably mounted in the main head 11, has a bent out portion 77 at its lower end which cooperates with a slot 78 in the sleeve 14. This member is raised when the sleeve is raised, but remains stationary when the sleeve is rotated to act as a holder against the wires to aid in the folding operation. An L-shaped slot 16 in the sleeve cooperates with a pin 17 in the main head to act as a guide for the sleeve when it is actuated. Pins 18 on the sleeve cooperate with the inclined surface of the sleeve actuating arms 19.

One of these arms is provided with a rack 20 (Fig. 8) which cooperates with a set of teeth 21 on the sleeve. The arms 19 are actuated by means of the plunger 22 of the solenoid 23.

The shaft 24 of the motor carries at the end nearer the wire holding head a cutting and griping head 25, the details of which are clearly shown in Fig. 9. This head consists of a sleeve surrounding the end of shaft 24, having a key 27 fastened thereto by means of screw 28 or an equivalent. Key 27, at the end away from the motor, is provided with serrations 29. A solenoid 30, (Fig. 1) the plunger of which operates a lever 31 pivoted at 32, actuates the sleeve of the head 25.

A twisting horn 33 is fixed permanently to the main shaft 24. Upon the operation of the solenoid 30 the sleeve 25 moves toward the twisting horn 33, and knife edges 34 provided on the sleeve, which cooperate with the rounded part of the twisting horn 33, will shear off the excess lengths of the wires and the serrations 29 on the key will hold the wires against the twisting horn. A pair of contact springs 35 and 36 located near the cutting and gripping head control the circuit for the starting of the twisting operation. These contacts are closed when the excess lengths of the wires, after being drawn around the twisting horn as shown in Fig. 9, are caused to move contact spring 35 into contact with spring 36.

In operation, a wire is taken from each of the cables which are to be connected. These wires 37 and 38 are first drawn about the projection 39 on the wire holding head. This projection or lug is provided with a cutting edge to aid in removing the insulation from the wires. After the insulation is stripped from the individual wires they are drawn over the twisting horn 33 and down causing closure of the contact between springs 35 and 36.

In drawing the wires over the twisting horn 33, the wire holding head 11 is drawn toward the motor and takes up the position shown in dotted lines in Fig. 1. This head actuates the contact springs associated with it to open the contact 40 and close contact 41. With the wire holding head contacts in this condition, the closure of the contact between springs 35 and 36 operates relay 42, (Fig. 10) by current from grounded battery 43, through armature 44 and associated contact of relay 45, conductor 46, contact springs 35 and 36, contact 41, conductor 47, through one winding of relay 42 to ground. Relay 42 locks up over a circuit from grounded battery 48, through the locking winding of relay 42, armature 49 and associated contact, armature 50 and associated contact of relay 45 to ground.

In operating, relay 42 causes the energization of the field of motor 13 as it closes the contact between armature 51 and its front contact thereby closing a circuit from battery 48 through armature 51, conductors 67 and 52, the field winding of motor 13, conductor 53, armature 54 and associated front contact to ground.

The operation of relay 42 also closes a contact between armature 57 and its associated contact which causes the operation of cutting and gripping solenoid 30 by a circuit from battery 43, armature 44 of relay 45, conductor 46, conductor 55, winding of solenoid 30, conductors 63 and 56 to ground through armature 57 of relay 42. The operation of solenoid 30 and lever 31 causes the closure of contact 58 which is actuated from the lever 31 by means of projecting rod 59. The closure of this contact closes a circuit through the armature of motor 13 from battery 43, conductor 46, contact 58, conductor 81 armature 60 and associated contact of relay 45, conductor 61 through the armature of the motor to ground. This will cause the motor to operate since the field was energized as described above.

The slow release relay 64 is in shunt with the motor armature circuit through resistance 65. It therefore operates, attracting its armature 66 to contact with the front contact. This provides a second ground for the locking circuit of relay 42, the other being through armature 50 of relay 45.

The motor operates until the wires are twisted off at the horn 33. The twisting off of the wires permits the wire holding head 11 to return to its normal position under the influence of a spring (not shown). In returning to its normal position, wire holding head 11 closes contact 40 and opens contact 41. The closure of contact 40 operates relay 45 by a current from battery 43 through the winding of relay 45, conductor 62, contact 40, conductors 63 and 56, armature 57 and associated contact of relay 42 to ground.

The operation of relay 45 opens the original locking circuit of relay 42 at the back contact of armature 50 of relay 45, but this locking circuit is maintained through the armature 66 and associated contact of relay 64. Relay 42 therefore does not release at this time.

Armature 44 of relay 45 moves away from its associated contact, opening the circuit through solenoid 30 which in turn causes the release of the wire gripping means and opens the motor armature circuit at contact 58.

As a result of the closure of the front contact of armature 50 the splice removing and folding solenoid 23 is operated by a circuit from battery 48, front contact and armature 51 of relay 42, conductor 67, winding of solenoid 23, conductor 68, front contact and armature 50 of relay 45 to ground. Arms 19 attached to the solenoid plunger are drawn toward the solenoid causing pins 18 on the sleeve 14 to ride on the inclined surfaces of the arms thereby raising the sleeve. This removes the loop of the splice from the wire holding head projection 39.

As pins 18 reach the highest point, rack 20 meshes with the pinion teeth 21 (Fig. 8) causing sleeve 14 to turn on its axis. Lug 15 on the upper end of sleeve 14 forces the twisted portion of the wires against the backing member 76, into the position shown in Fig. 6.

Armature 60 of relay 45 when this relay operates, opens its back contact and closes its front contact. Opening the back contact merely puts another open point in the armature circuit, while closing the front contact short-circuits the motor armature through the winding of relay 64, which is of low resistance, thereby quickly bringing the motor to rest.

Relay 64 remains operated momentarily due to the decaying armature current and its slow release characteristic. Soon after the stopping of the motor, relay 64 releases, opening the locking circuit of relay 42 at the front contact of its armature 66. Relay 42 in releasing, opens, at the front contact of armature 57, the energizing circuit for relay 45, thereby causing it to release.

If the motor 13 stops in any but the normal position of rest, the reset mechanism 69 (Fig. 10), will maintain contact 70 closed. With relays 42 and 45 in the released positions, and contact 70 closed, the field of motor 13 will be energized by a circuit from battery 43, back contact and armature 44 of relay 45, conductor 46, contact 70, conductor 73, back contact and armature 54 of relay 42, conductor 53, field winding of motor 13, conductor 52, armature 51 and back contact of relay 42 to ground. It will be noted that current passing in the circuit just traced is in the opposite direction to that in the circuit when the motor is twisting the wires.

The current for the motor armature passes from battery 43, back contact and armature 44 of relay 45, conductor 46, contact 70, conductor 73, resistance 74, conductor 81, back contact and armature 60 of relay 45, conductor 61 through the motor armature to ground. Since the armature current passes through resistance 74 and the field current is reversed, the motor and cam 71 rotate slowly in a counter-clockwise direction as viewed in Fig. 10. The cam is arranged to cause the opening of contact 70 when the motor shaft has been moved sufficiently to bring the twisting horn 33 into the starting position. The opening of contact 70 opens both the motor field and armature circuits as just traced. A shoulder 75 is provided on the cam to prevent the motor armature overrunning the normal rest position. The twisting horn 33 and wire gripping means are then left in position for the next splicing operation.

What I claimed is:

1. In a wire splicing machine having a projection around which the wires to be spliced are bent, means for twisting the wires together, and means actuated upon the completion of the twist to remove the twisted portion from said projection and bend it into alignment with the untwisted portion of the wires.

2. In a wire splicing machine having a projection around which the wires to be spliced are bent, means for twisting the wires together, and automatic means actuated upon the completion of the twist to remove the twisted portion from the projection and fold it into alignment with the untwisted portion of the wires.

3. In a wire splicing machine, a wire holding head, a projection thereon around which the wires are bent to form the base of the splice, a sleeve surrounding said head, means to twist the wires together, and means automatically operated at the completion of the twist to cause relative longitudinal and rotary movement between the head and sleeve to remove the twisted portion of the wires from the projection and bend it into alignment with the untwisted portion of the wire.

4. In a wire splicing machine, a wire holding head, contacts actuated thereby, a sleeve surrounding said wire holding head and electromagnetic means controlled by said contacts to move said sleeve longitudinal of said head and to give said sleeve a rotary movement at the end of the longitudinal motion.

5. In a wire splicing machine, a wire holding head, a sleeve surrounding said head, a motor driven shaft, wire gripping means on said shaft, contacts near said gripping means actuated by wires drawn therethrough to actuate said shaft, other contacts actuated by said wire holding head, and electromagnetic means controlled by said last mentioned contacts to move said sleeve along said head and to give the sleeve a rotary movement at the end of its travel.

6. In a wire splicing machine, a wire holding head, a projection thereon about which the wires to be spliced are drawn, a moveable sleeve surrounding said head, electromagnetic means associated with said sleeve, a revolvable shaft having wire gripping means thereon for twisting the wires together, contacts near the gripping means actuated by drawing the wires therethrough to control the movement of the shaft, contacts associated with said wire holding head actuated upon the completion of the twisting movement, certain of said contacts causing the motor to stop, others actuating the electromagnetic means to move the sleeve longitudinally of the head to remove the twisted wires from the projection on said head and to give the sleeve a rotary motion at the end of its longitudinal movement to bend the twisted wires into substantial alignment with the untwisted portions of said wires.

7. In a wire splicing machine, a wire holding head, a projection thereon around which the wires to be spliced are bent, means for twisting the wires together, a sleeve surrounding said head automatically actuated upon the completion of the twist to remove the twisted portion of the wires from said projection and bend it into alignment with the untwisted portion of the wires, a second projection on said head to hold the untwisted portion of the wires fixed during the bending movement.

In witness whereof, I hereunto subscribe my name this 28th day of May A. D., 1926.

DAVID T. MAY.